United States Patent [19]
Dolan et al.

[11] Patent Number: 5,646,192
[45] Date of Patent: Jul. 8, 1997

[54] POLYTETRAFLUOROETHYLENE MOLDING POWDER

[75] Inventors: John W. Dolan, Boothwyn, Pa.; Charles E. Singleton, Wilmington, Del.

[73] Assignee: W. L. Gore & Associates, Inc., Newark, Del.

[21] Appl. No.: 323,461

[22] Filed: Oct. 12, 1994

Related U.S. Application Data

[63] Continuation-in-part of Ser. No. 21,409, Feb. 23, 1993, abandoned.

[51] Int. Cl.$^6$ ................................. C08J 9/16; C08J 9/22
[52] U.S. Cl. ................... 521/56; 521/57; 521/59; 525/199
[58] Field of Search ..................... 525/199; 521/56, 521/57, 59

[56] References Cited

U.S. PATENT DOCUMENTS

| | | |
|---|---|---|
| 3,953,412 | 4/1976 | Saito et al. . |
| 3,953,566 | 4/1976 | Gore . |
| 3,981,853 | 9/1976 | Manwiller ........................ 526/255 |
| 4,379,858 | 4/1983 | Suzuki . |
| 4,454,249 | 6/1984 | Suzuki et al. ........................ 521/54 |
| 4,714,748 | 12/1987 | Hoashi et al. . |
| 4,770,922 | 9/1988 | Hatakeyama et al. . |
| 4,882,113 | 11/1989 | Tu et al. ........................ 264/127 |
| 5,071,609 | 12/1991 | Tu et al. . |
| 5,110,527 | 5/1992 | Harada et al. . |
| 5,118,788 | 6/1992 | Hosokawa et al. ........................ 528/503 |
| 5,156,343 | 10/1992 | Sueyoshi et al. . |
| 5,242,765 | 9/1993 | Naimer et al. . |
| 5,403,524 | 4/1995 | Bürger et al. ........................ 264/22 |
| 5,429,869 | 7/1995 | McGregor et al. ........................ 428/364 |

FOREIGN PATENT DOCUMENTS

| | | |
|---|---|---|
| 0106180 | 9/1983 | European Pat. Off. . |
| 1082859 | 9/1967 | United Kingdom . |

*Primary Examiner*—Helen Lee
*Attorney, Agent, or Firm*—Gary A. Samuels, Esquire

[57] ABSTRACT

In this invention a new form of polytetrafluoroethylene has been found to be compression moldable to provide exceptionally strong molded articles. It is also useful as an additive or strength binder. The new form is a compression molding powder comprised of comminuted, sheared particles of expanded porous polytetrafluoroethylene, said particles having a nudular-microfibrilar structure of irregular shape, and a mean particle size between 5 and 500 micrometers. By irregular shape is meant that the nodes and fibrils do not have an ordered arrangement. The bulk density is about 0.06 to 0.2 g/cc.

3 Claims, 4 Drawing Sheets

POLYTETRAFLUOROETHYLENE MOLDING POWDER

CROSS-REFERENCE TO RELATED APPLICATIONS

This application is a continuation-in-part of application Ser. No. 08/021,409, filed Feb. 23, 1993, now abandoned.

FIELD OF THE INVENTION

This invention relates to polytetrafluoroethylene molding powders useful in compression molding techniques.

1. Background of the Invention

Polytetrafluoroethylene (PTFE) is made in two distinct forms by different processes. One form is the so-called "fine powder" form produced by polymerizing tetrafluoroethylene in an emulsion so that the polymer particles do not precipitate. After polymerization is complete the particles are coagulated. This form of PTFE cannot be compression molded.

On the other hand, the so-called granular form of polytetrafluoroethylene is produced by polymerization of tetrafluoroethylene and precipitation in situ as the polymerizate forms. This form of polytetrafluoroethylene can be compression molded by taking the polymer powder, filling a mold, compressing the powder in the mold while heating it to coalesce the powder, and then removing the compressed powder from the mold. The resulting molded articles are not as strong as desired and ways of making stronger molded articles of polytetrafluoroethylene are continually sought after.

2. Summary of the Invention

In this invention a new form of polytetrafluoroethylene has been found to be compression moldable to provide strong molded articles. It is also useful as additive or strength binder.

The new form is a compression molding powder comprised of comminuted, sheared particles of expanded porous polytetrafluoroethylene, said particles having a bulk density of between 0.06 and 0.2 g/cc, a nudular-microfibrillar structure of irregular shape, and a mean particle size between 5 and 500 micrometers.

The particles are entangled, which provides good strength in addition to the strength of the expanded porous PTFE structure. It is the high strength that is an important part of the present invention.

Preferably the porous expanded PTFE that is used in this invention is expanded at least 8:1 times its original length and more preferably 50:1 or more. There is no upper limit on degree of stretching.

The particles of the present invention can be produced in the following manner:

Expanded polytetrafluoroethylene in the form of sheets, rod, tape, fiber or a towed fiber, is sized reduced initially by a shredding type mill to particles of a size to be further sized reduced by a secondary milling operation described below. Towed expanded PTFE fiber is a preferred starting raw material since the towing process provides an efficient means for size reducing expanded PTFE tape or rod into fine discontinuous fibers. These fine discontinuous fibers, or continuous fibers in case of untowed fiber material, are then further size reduced by shredding the fibers into fine staple fibers (about 6 mm (¼ inch) in length), This fiber length is suitable for additional size reduction by the secondary milling operation mentioned previously. The milling operation uses a colloid mill. Larger fiber lengths should be avoided since they tend to classify within the colloid mill resulting in decreasing the efficiency of the colloid mill. A colloid mill useful to reduce the fine discontinuous and continuous staple fiber is a modified Morehouse Super 800 series colloid mill. The Morehouse mill can be modified by securing the mill stones as is taught in U.S. Pat. No. 4,841,623 to Rine.

This modified colloid mill provides a means to size reduce expanded PTFE material to particles sizes down to submicron levels but typically the mill is used to reduce material to particles of an average size of 40 micrometers. Larger particle sizes are attainable as well e.g. 200 micrometers by varying the coarseness (grit size) of the milling stones. Additionally, this mill can be adjusted such not to melt or coalesce the fluoropolymeric particles consisting of expanded PTFE material during the comminution process. The problem of melting or coalescing the particles during comminution is a common problem with other comminution methods and processes were extensive amounts of heat is generated during the comminution operation.

This material can be used as a molding powder with increased strength due to its superior matrix tensile strength resulting from the expansion process of the raw material PTFE before comminuting. Additionally, the material can be used as an additive or strength binder or fiber reinforcement to other materials such as to carbon black substrates or other organic polymers, such as polyacetal, polycarbonate, NBR rubber, natural latex rubber, polyvinylidene and hexafluoropropylene fluoride, or the like. Elastomeric polymers are preferred. The high strength of the comminuted expanded PTFE fibers act as tensors in the polymeric substrate. Typically, a comminuted particle possessing a defined aspect ratio is desired for this type of application over a spherical or elliptical particle. A pronounced aspect ratio defining the particle's geometry aids in the strength enhance due to the entangling of particles with themselves and/or other materials when added to composites. The aspect ratio of a particle is a dimensionless number greater than or equal to one and is defined as the particle's length divided by its width or diameter. Additionally, the particle's length is greater than its width or diameter.

DESCRIPTION OF THE DRAWINGS

The operation of the present invention should become apparent from the following description when considered in conjunction with the accompanying drawings.

DETAILED DESCRIPTION OF THE INVENTION

Figure 1:
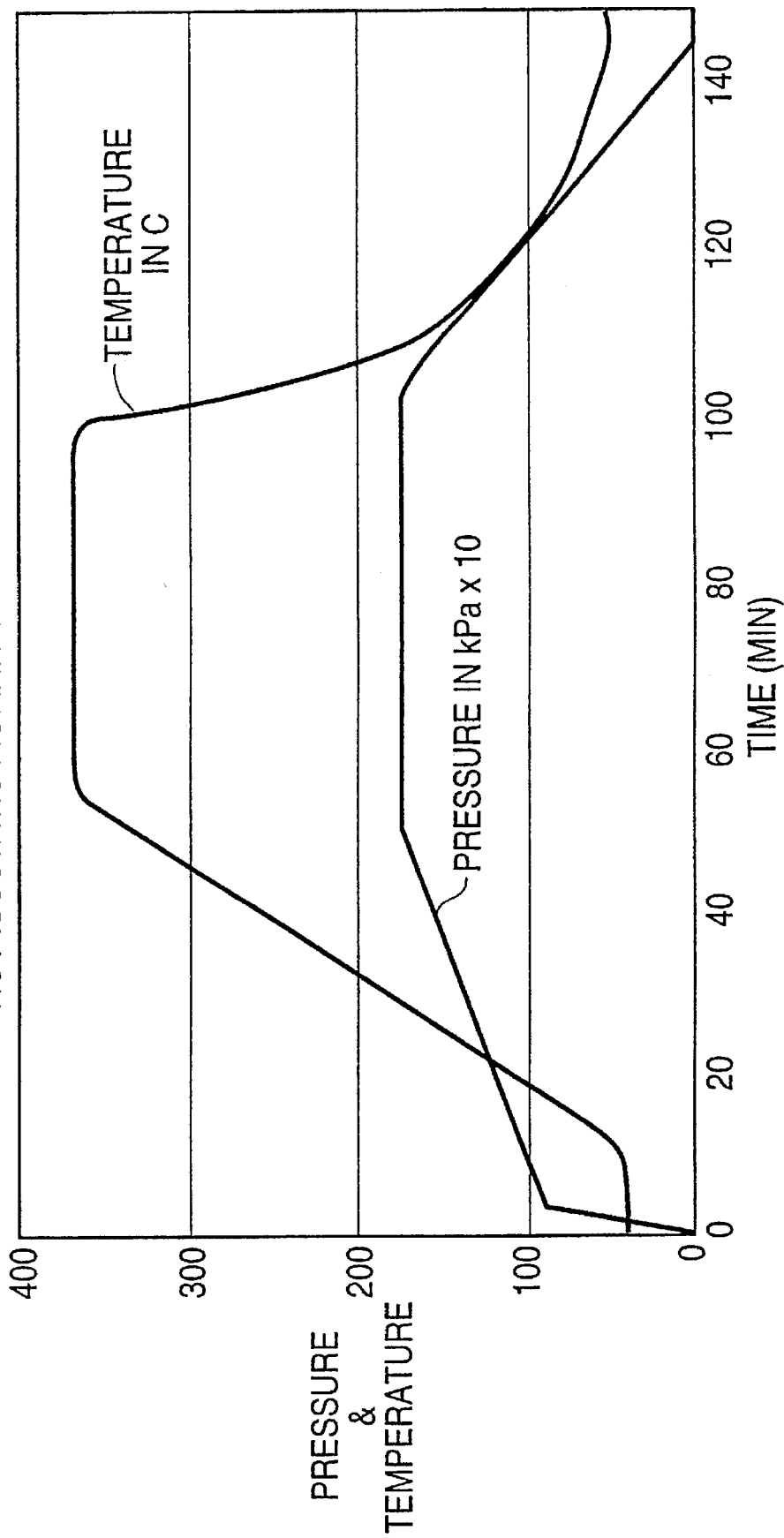
FIG. 1 is a plot of a temperature and pressure cycle for a hot-isostatic molding process used for PTFE.

The expansion, i.e., or stretching of polytetrafluoroethylene is a well-known procedure and is described in U.S. Pat.

No. 3,953,566. Preliminary, the type of PTFE called fine-powder, which may contain a filler material, is mixed with a sufficient amount of a hydrocarbon extrusion aid, usually an odorless mineral spirit until a paste is formed. The paste is compressed into a billet and subsequently extruded through a die in a ram-type extruder to form a coherent PTFE shape which can be in the form of a rod, filament, tube or, preferably a sheet or a film.

The coherent PTFE shape is optionally compressed and then dried by volatilizing the hydrocarbon extrusion aid with heat. Volatilization of the extrusion aid results in a coherent PTFE shape having a small degree of porosity. The resulting porous PTFE material is expanded and stretched according to the method taught in U.S. Pat. No. 3,953,566 to Gore.

The material may be stretched uniaxially, only in a longitudinal direction; biaxially, in both longitudinal and transverse directions; or radially, in both longitudinal and transverse directions simultaneously. It may be stretched in one or more steps.

The coherent PTFE shape forms an expanded porous PTFE (ePTFE) article as it is stretched. The ePTFE article is characterized by a series of nodes interconnected by fibrils. As the coherent PTFE shape is expanded to form the ePTFE article.

Any suitable apparatus for grinding or comminuting tough polymeric or elastomeric materials without the use of radiation may be used for producing the porous expanded PTFE particles, such as the apparatus disclosed in U.S. Pat. No. 4,614,310 and U.S. Pat. No. 4,841,623. This apparatus employs two parallel stones having a hole in the middle of the stones, affixed on a common axis but secured circumferentially and rotating at high speeds (3600 rpm) in opposite directions of each other. Material to be ground is coarsely cut and mixed with water to produce a wet slurry and then the slurry is placed in the middle of the rotating stones. The material is moved or slung by centrifugal force across the surface of the stones. A hydrodynamic layer is created between the closely spaced rotating stones and the water slurry. This hydrodynamic layer forces the particles on the stone's surface outwards across the stone. Size reduction of the particle occurs as the particle bumps into and along the stone's sharp edges located on the stone's surface as the particle travels along its torturous path from near the center of the stone to the outside of the stone. It is important that the gap between the stones is kept sufficiently tight so that a strong hydrodynamic layer is maintained between the stones, forcing the particles outwards. If the gap is not sufficiently tight, the particles will ride in the center of the hydrodynamic layer and not touch the stone's surface resulting in no size-reduction of the particle.

The overall amount of size reduction is a function of the stone's grit size and the time the particle is exposed to the stone. The space between the stone comes into play by maintaining a hydrodynamic layer between the stones. Once the gap between the stones is sufficiently narrow to allow size-reduction to occur, then any further gap narrowing will not lead to a decrease in particle size. However, the gap dimension is critical to the overall particle size variance. The tighter the gap between the stones after the hydrodynamic layer is created, the more consistent mean particle size is produced. This is due to the probability of particles entering and leaving the hydrodynamic layer during the grinding operation due to the strength of the hydrodynamic layer and the kinetic energy of the particle as it transverses its path between the stones. The tighter the gap between the stones, the less likelihood the particle can enter into the center of the hydrodynamic layer and not be size-reduced.

It is useful to secure the mill stones of a Morehouse Super 800 series colloid mill circumferentially as taught in U.S. Pat. No. 4,841,623 to Rine, as opposed to securing them in the common axial mounting configuration. The circumferentially mounting of the stones permits the stones to withstand higher rotational velocities. When the grinding stones rotate at the increased rotational velocities in the colloid mill, it is found that expanded PTFE can be sized reduced to a mean particle size of 40 micrometers and smaller without severe degradation to the nodal-fibril structure inherent to the expanded PTFE material.

Figure 3:
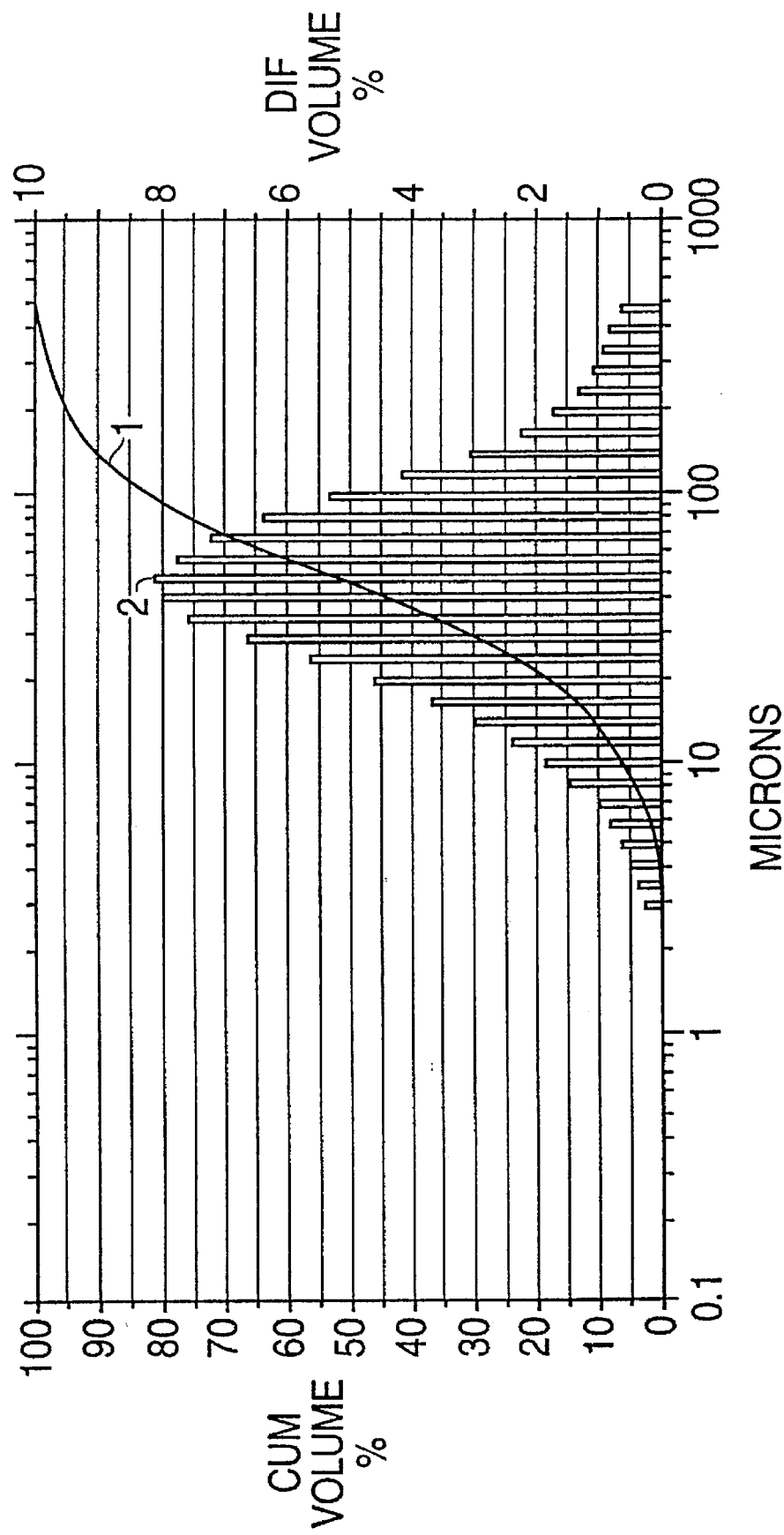
FIG. 3 is a graph plotting the average particle sizes of comminuted expanded PTFE particles generated for use with the present invention, the graph comprising the cumulative volume and differential volume.

The graph of FIG. 3 illustrates a typical range of particle sizes of expanded PTFE generated through the above procedure. Curve 1 represents the cumulative volume; the bar graphs 2 represent the differential volume. The graph indicates that the greatest quantity of particles (i.e. 50%) produced in this manner are between 17 to 50 microns.

Common size reduction techniques for PTFE and plastics use radiation to render the material brittle to allow the material to be size reduced to particles sizes below 100 micro-meters. Unfortunately, the irradiation process destroys the nodal-fibril structure of the expanded PTFE material. Excessive heat during the irradiation process is not a desirable condition as well since melting of the thermoplastic and or fluorothermoplastic may occur resulting in particle agglomeration. The use of the modified Morehouse Colloid mill provides an alternative to the use of irradiation to yield particles of sized reduced PTFE and size reduced expanded PTFE below 100 micro-meters.

Figure 4:
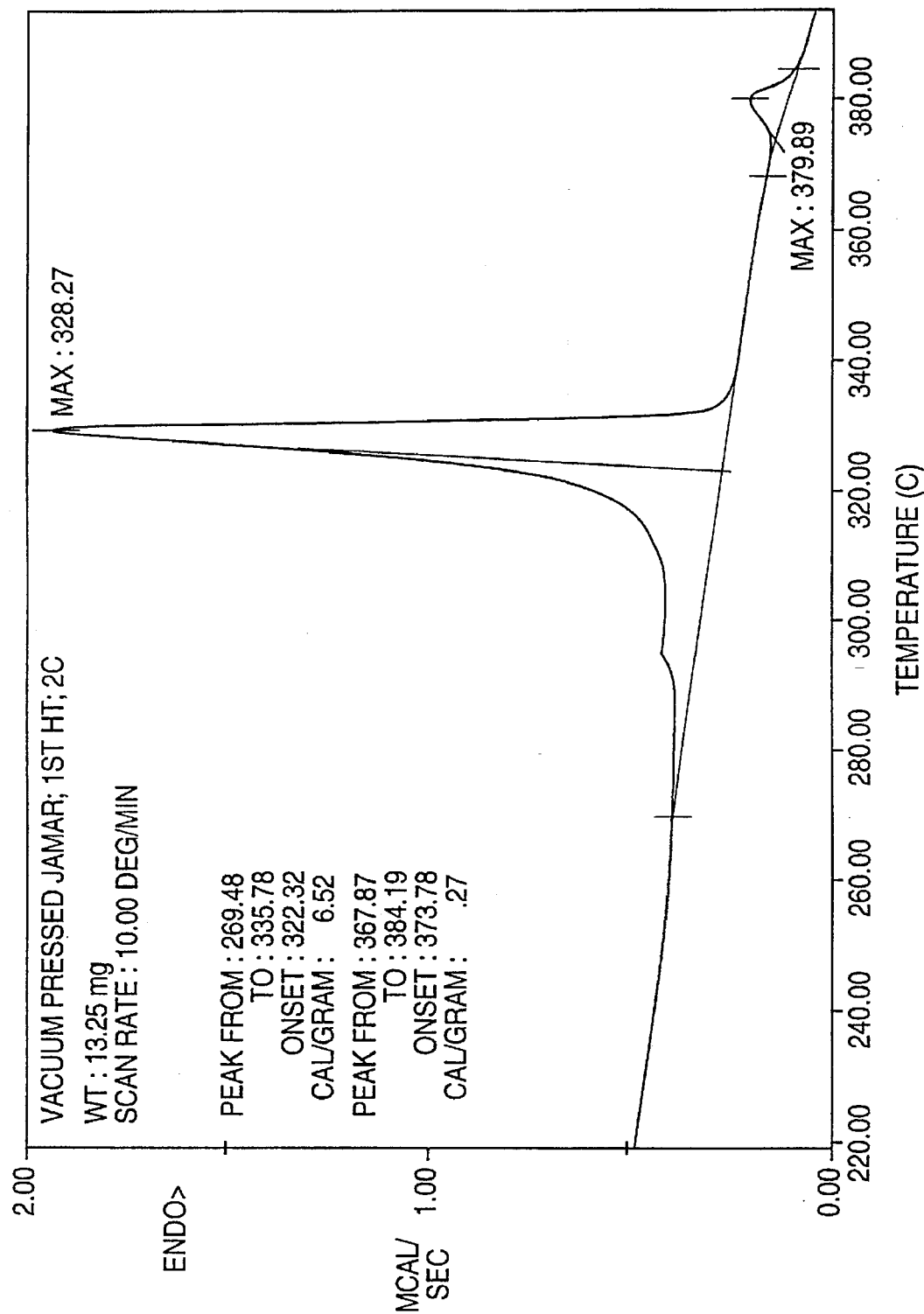
FIG. 4 is a plot of a Differential Scanning Calorimeter (DSC) trace which was performed on comminuted ePTFE material which had been hot-isostatically molded into a thin sheet. The endothermic peak at about 379° C. indicates an oriented, PTFE structure.

The comminuted particles of porous expanded PTFE retain their nudular-fibrillar microstructure. The particles are characteristically irregularly shaped and may be somewhat ragged as a result of shearing and splitting the porous expanded PTFE pieces during the grinding process. The particles have an aspect ratio of between 3 and 50 and are entangled. The comminuted ePTFE material, with its high surface area and fibrillar, porous nature. The increase likelihood for particle entangling is enhanced by a higher degree of expansion of the PTFE before comminution. It was found that PTFE that was expanded longitudinally eighty-to-one exhibited a particle distribution which consisted of particles possessing large aspect ratios as compared to PTFE that had been expanded eight-to-one longitudinally. Moreover, the matrix tensile strength of the PTFE is enhanced by increasing the degree of expansion. Additionally, the particles retain the strength of the oriented structure resulting from the expansion process as seen in FIG. 4. FIG. 4 is a Differential Scanning Calorimeter (DSC) plot which was performed on comminuted ePTFE material which had been hot-isostatically molded into thin sheets. The DSC plot was generated using model DSC-4 from PERKIN-ELMER Corporation using a scan rate of 10 degrees Celsius per minute and sample weights averaging 13 milligrams. The peak at 379.83° C. is indicative of an oriented PTFE structure.

Additionally, the improved molding powder of the present invention exhibit different morphologies depending on the starting material. For example, if ePTFE fiber is used, the comminuted molding powder particles have an aspect ratio and appear fluffy and springy. On the other hand, molding powder particles resulting from the comminution of biaxially expanded PTFE membrane are plate-like. Molding powder flowability was found to be improved by partially sintering the expanded PTFE material prior to comminution.

The inventive material can be hot isostatically molded into two and three dimensional articles. It was found that the strength of the hot-isostatically formed articles made of the comminuted expanded PTFE materials were higher than that of the non-expanded material: The material can be sintered, i.e., heated above 327° C. for a period of time to reach equilibrium thermally to coalesce the ePTFE particles and or the nodal-fibril structure inherent to the expanded PTFE matrix.

The inventive material can be processed into articles using a procedure referred to as vacuum compression molding of polytetrafluoroethylene. The powder of the present invention is placed in a mold of a desired shape. A vacuum can be drawn, if desired, and then the material is compressed at pressures of between 1500 and 1600 psi (100 and 412 bar) at a temperature between 20° (ambient) and 380° C. and for a time of between 1 second and several minutes to reach equilibrium. With the use of vacuum and heat, lesser compression loads are required to reach densities greater than 1 g/cc to full density 2.2 g/cc.

Upon removal from the hot mold, the molded article can be cooled then sintered, or can be directly sintered without cooling.

In one type of molding operation, called hot isostatic molding as mentioned above, the material of the present invention, comminuted, porous stretched PTFE particles are placed in a container and enclosed in an air-tight heat resistant wrapping. A vacuum is then drawn on the enclosed material to about 20 inches of mercury (670 millibar). The enclosed vacuumed material is then pressurized in an autoclave to about 200–275 psi (14–19 bar) for 30–60 minutes at 350°–400° C. The molded part is then removed and cooled.

In another type of molding operation, called compression molding, the material of the present invention, comminuted, porous stretched PTFE particles are placed in a mold and compressed to 1450–2500 psi (100–172 bar) at room temperature (15°–25° C.). If desired, the compression can take place when a vacuum is pulled on the article. If desired the compression molded article can be sintered at above the 327° C.

Below are examples describing different methods of producing articles of the present invention:

EXAMPLE I

Quantities, approximately 20 kg of expanded porous polytetrafluoroethylene in the form of 12.7 mm diameter rod which had under gone an expansion of eight to one and approximately 20 kg of expanded polytetrafluoroethylene in the form of 44–133 tex (1 tex=1 gram/1000 meters) fiber which had under gone an expansion of eighty to one, obtained from W. L. Gore & Associates, Inc., were size reduced to particles or flakes 1 to 6 mm diameter or longest length, using a shredder-type grinder Model 435600-82005, from Cumberland, Leesona Corporation, Providence R.I. The shredder was outfitted with a sizing-screen containing 6.4( mm (0.25(inch) holes.

The 1–6 mm diameter or longest length particles or flakes were then further sized reduced using a modified Morehouse Super 800 series colloid mill. The Morehouse mill is modified by securing the mill stones as is taught in U.S. Pat. No. 4,841,623 to Rine, as described further above.

Tap water was added to the sized reduced material in the hopper which feeds the colloid mill. A water and ePTFE slurry was produced in the hopper with a concentration of water to ePTFE of 50:50. Note that the higher the concentration of ePTFE to water is made, the better the efficiency of the mill. Although there does exists a peak concentration ratio since too much ePTFE to water ratio will result in excessive heat build-up on the stones. The stone must be kept cool during the milling operation. Excessive heat build-up in the stones will render the stone useless as well as the heat will melt the thermoplastic coating on the ePTFE material. The preferred water and PTFE concentration is 35–40% PTFE to 65–60% water to allow for adequate cooling of the stones and the coated ePTFE material.

The size reduced material exits the mill as a slurry. This slurry material was then placed on flat aluminum pans in a forced air convection oven at a temperature of 150° C. and remained there until the water evaporated.

The pans were removed from the oven and the cake like material was fractured by blending the material using a standard household food blender. The material can be fractured or deagglomerated as well by shaking it in a closed container.

The resulting products were comminuted porous expanded PTFE material comprising of finely ground particles of irregular shape. The comminuted material having under gone initially an expansion of eight to one possessed a plate-like morphology whereas the comminuted material having undergone initially an expansion of eighty to one posses a pronounce aspect ratio.

The comminuted particles preferably will have a mean particle size between 5 and 500 μm, more preferably between 80 and 200 p.m. Particle size was determined as follows: using a magnetic stirrer and ultrasonic agitation, 2.5 grams of milled ePTFE powder were dispersed in 60 ml isopropyl alcohol. (Ultrasonic Probe Model W-385, manufactured by Heat Systems-Ultrasonics, Inc.). Aliquots of 4–6 ml of the dispersed particles were added to approximately 250 m of circulating isopropyl alcohol in a Leeds & Northrup Microtrac FRA Particle Size Analyzer. Each analysis consisted of three 30 second runs at a sample circulation rate of 2 liters/minute during which light scattering by the dispersed particles is automatically measured and the particle size distribution automatically calculated from the measurements.

The particles will preferably have an average surface area of between 1 and 4 sq. m/gram as determined by specific surface area measured by the Micromeritics surface area analyzer. The surface area analyzer uses the BET(1) method to calculate surface area. In this sample analysis, the desorption isotherm of a single point analysis was used to calculate the surface area. The comminuted, expanded, porous PTFE materials prepared as described above were placed on individual metal sheets, 14 inches by 24 inches (355 mm×610 mm) to a thickness of approximately ⅛ inch (3 mm). A normal household food blender was used to break-up clumps of the comminuted materials before being placed on the metal sheets. A flour sifter was used in aiding the laying down of the powders on the sheets uniformly. The resulting thickness of the uniform layer of powder was 3–4 mm in depth. Strips of expanded porous PTFE tape 118 inch (3 mm) thick, ¾ inch (19 mm) wide were placed on the perimeter of the metal sheets to stop any powder from falling off the metal sheets during the loading of the powder on the metal sheet.

The individual sheets were then stacked on top of each other and placed on a metal bed that contains holes for evacuation. A loose sheet of KAPTON\ from DuPont was placed over the stacked sheets and affixed to the metal bed with high temperature silicone rubber material. The KAPTON sheet was loosely folded and attached to itself with the high temperature silicone rubber to make a collapsible envelope around the metal sheets containing the powder materials.

The bed containing the stack sheets surrounded by the collapsible KAPTON sheet was then placed in a autoclave. A vacuum hose was connected to the metal bed so that a vacuum could be drawn on the powder. The KAPTON envelope around the stacked sheets containing the powder collapses on top of the stacked sheets as a result of the vacuum drawn on the powder.

After a vacuum was obtained of at least 20 inches of mercury (677 millibar), the material was then subjected to heat and pressure. The pressure is obtained by pressurizing the autoclave with $CO_2$ gas. The material was subject to 250 psi (17.2 bar) pressure for approximately 55 minutes and a maximum temperature of 375° C. for about 45 minutes. The typical cycle is two and one half hour in duration.

After the autoclave cycle, the bed containing the sheets was removed from the autoclave, cooled to room temperature and disassembled. The molded PTFE sheets are easily peeled from the metal sheets.

Samples subjected to the foregoing procedure were comminuted ePTFE obtained from ePTFE material which had been expanded at an 8:1 ratio; comminuted ePTFE material which was obtained from ePTFE fiber expanded at a 80:1 ratio; and for comparison purposes, DuPont Co. Granular PTFE resin 7A; and DuPont Granular PTFE resin 9B. FIG. 1 is a typical trace of the autoclave cycle in which temperature and pressure are traced in real time.

Below is a table setting forth the tensile strength, young's modulus, and the ball plunger test as per ASTM 638 and ASTM 882 test methods of the above materials.

TABLE

| | STRENGTH RESULTS | | |
|---|---|---|---|
| Material | Tensile (psi) [bar] | Young's lbs/ in (thk) Modulus (psi) [bar] | Ball Plunger ASTM D638 & ASTM D882 [N/cm thk] |
| Comminuted ePTFE 8:1 | mean: 4525 [312] std: 605 [42] | mean: 56560 [3900] std: 3322 [229] | 7560 [1324] |
| Comminuted ePTFE 80:1 | mean: 6118 [422] std: 548 [38] | mean: 58400 [4026] std: 4835 [333] | 14375 [2517] |
| 7A PTFE Resin | mean: 3332 [230] std: 821 [57] | mean: 41570 [2866] std: 2845 [196] | 6480 [1135] |
| 9B PTFE Resin | mean: 3161 [216] std: 425 [29] | mean: 49420 [3407] std: 2759 [190] | 7755 [1358] |

As shown in the above table, the samples of expanded, porous PTFE that were comminuted and molded using a hot isostatic molding process, exhibited increased tensile strength and young's modulus over non-expanded materials undergoing the same hot isostatic molding process. The highly oriented (80:1) ePTFE unsintered material that was comminuted and processed using the hot isostatic process forming sheet samples was twice as strong (Tensile Strength & 1 inch (25.4 mm) Ball Plunger as per Test ASTM D638 and ASTM D882) as sheets formed in a similar manner consisting of granular polytetrafluoroethylene resins 7A & 9B from DuPont.

The increased strength of the molded article consisting of the comminuted expanded, porous PTFE is believed to be the result of retention of the strength of the original oriented PTFE structure which posses high strength which was imparted by the expansion process. The comminuting process reduces the oriented structure having high strength into small particles which apparently remain oriented (for each particle in itself) and thus each particle has high strength as well.

Figure 2:
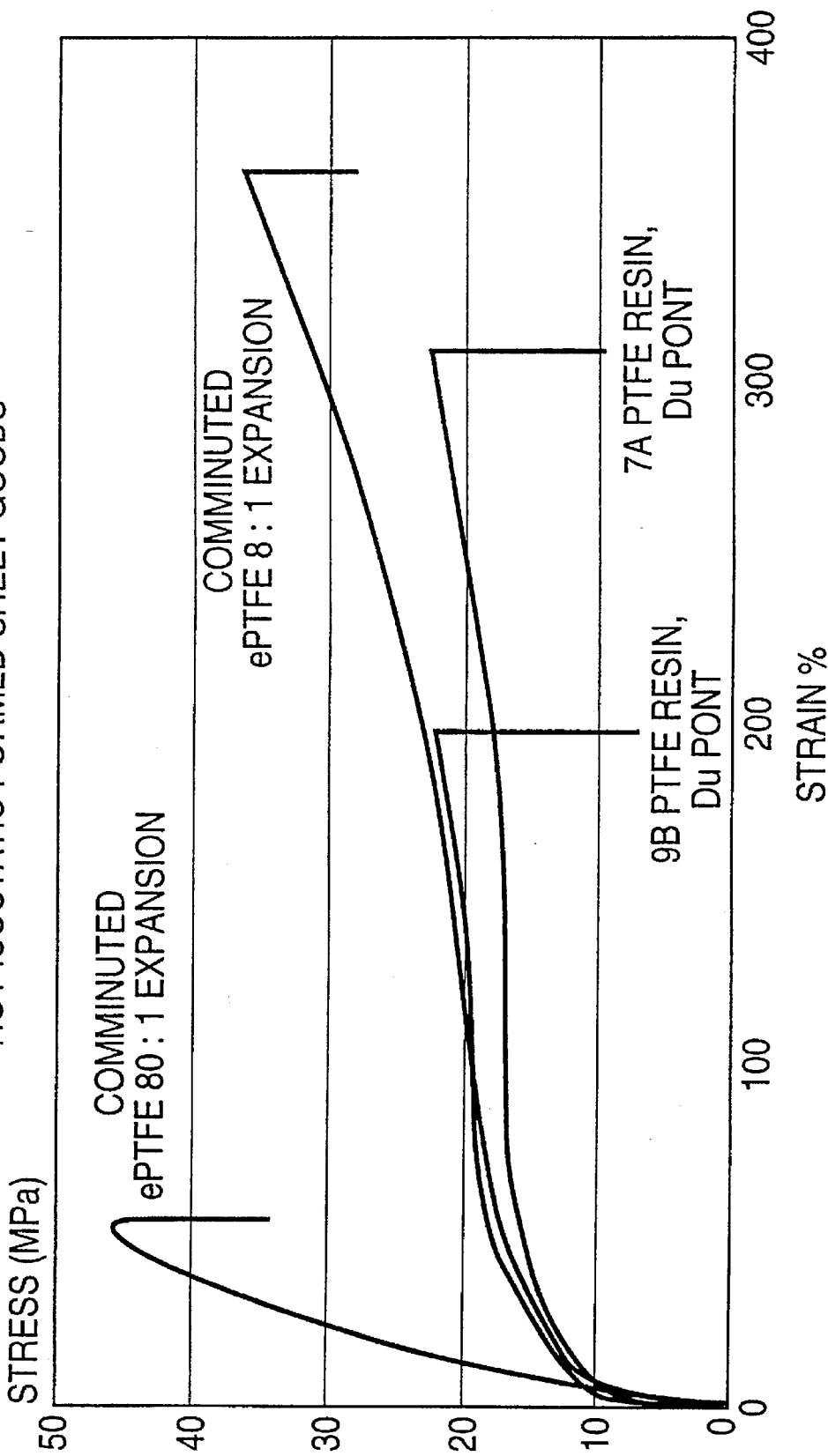
FIG. 2 is a graph of stress vs. strain of hot isostatically formed sheet samples showing the increased tensile strength and toughness of the present invention.

FIG. 2 is a stress-strain plot comparing the products of this example after processing by the Hot Isostatic molding process. It is evident from FIG. 2 that the overall stress-strain behavior of the PTFE may be affected by the history (thermal, mechanical, etc.) of the PTFE before the molding process. The shape of molded comminuted expanded, porous PTFE fiber stress-strain locust is shown to be different from the other loci. The locust is concave down (i.e. 2nd derivative is negative, hence a decreasing stress/strain ratio) with no inflection point as shown in the other three loci.

The tensile strength of the coupons were measured using a tensile tester Model #1011 from the INSTRON Corporation of Canton, Mass. The INSTRON machine was outfitted with clamping jaws which are suitable for securing the coupons during the measurement of tensile loading. The cross-head speed of the tensile tester was 25.4 cm per minute. The gauge length was 101.6 mm. The ASTM style dog-bone test specimens having a major rectangular section of 12.7 mm×70 mm rectangular (overall length of the dog-bone coupon is 165.1 mm containing 19.1 mm wide tabs on both ends) were cut from the sheets using a steel-rule die and a clicker press.

EXAMPLE II

The following is an example of a method for hot-isostatically forming a three dimension object using materials of the present invention:

A three-dimensional shape was produced hot-isostatically using as the molding powder, comminuted unsintered, longitudinally expanded polytetrafluoroethylene expanded eight to one as described in Example I above. The shape consists of a 4.0 inch (101.6 mm) hollow cylindrical base capped off by a 4.0 inch (101.6 mm) dome. The overall height was 3 ½ inch (88.9 mm).

A six part aluminum die was machined to produce the three-dimensional part. A concave and cylindrical plunger section that was used for compressing the powder against the convexed base of the die assembly and four curved plates for compressing the powder against the cylindrical section of the plunger (quarter sections).

The die filled with the unsintered comminuted expanded, porous PTFE was wrapped in a KAPTON bag and placed into the autoclave. A vacuum was drawn to at least 26 inches (88K Pascal) of mercury within the bag where the die was located thus subjecting the powder to the vacuum. Heat and pressure were applied to the die with similar conditions as in Example I using the autoclave cycle outlined.

After the heat, pressure, vacuum, and cooling operation, the article was removed from the autoclave. The die was disassembled and the molded article was removed from the aluminum die.

EXAMPLE III

The following is an example of a method for hot-isostatically forming a thin-wall sleeve around a three dimensional cylinder using materials of the present invention:

A coating of comminuted expanded, porous PTFE material was placed on a 6 inch (152 mm)×12 inch (305 mm)

long aluminum drum using the hot-isostatic process. A tube having an inside diameter of 6.25 (159 mm) was placed over the 6 inch (152 mm)×12 inch (305 mm) long aluminum drum which was standing on end on top of a rigid table. Comminuted, unsintered, longitudinally expanded, porous PTFE expanded eight to one as described in Example I was filled in the ⅛ inch (3 mm) gap between the tube and drum. During the filling operation, a thin wall tube having an outside diameter of 6.22 inch (158 mm) and an inside diameter of 6.06 inch (154 mm) was placed in between the two articles tapping down the expanded, porous PTFE powder by hand. When the die assembly was filled with the expanded, porous PTFE powder, the die was placed in a press. Using the thin wall tube, the powder was subjected to a 100 psi (690 KPa) pressure in the axial direction of the aluminum drum. This pressing operation made the ePTFE powder semi-rigid around the drum and allowed for easy handling of the drum for further operations.

Four 12 inch (305 mm) long quarter panels having each an inside radius of approximately 3.1 inch (78.7 mm) were taped equally spaced to the outside of the drum using high temperature KAPTON Adhesive tape. A bag of KAPTON sheet material was made into a large loose envelope. The drum coated with the comminuted expanded, porous PTFE powder having the four quarter panel strapped to it, was placed in the KAPTON bag and sealed suing high temperature silicone rubber.

A fitting was placed through one side of the KAPTON bag so to draw a vacuum inside the bag. The base assembly was then placed in the autoclave and subjected to heat, pressure, and vacuum with similar conditions as stated in Example I. Following the autoclave process, the drum was cooled to room temperature and the four quarter panels were removed. The resulting structure was a drum coated with PTFE having four ridges equally spaced along the axis of the drum which protruded from the coating. The ridges are the result of the interfacing of the four quarter panels as the panels moved towards the enter axis the drum during the compression operation in the autoclave.

The PTFE coating on the drum was then machined on the lathe using tool steel as the cutting tool. The PTFE coating machined very nicely producing a smooth uniform finish.

The coating on the drum did not rotate or move on the drum during the cutting/turning operation. This means the coating was securely affixed to the drum, even though no adhesive was used to bond the PTFE to the aluminum drum. It is doubtful that there exists a chemical bond between the two materials based on the chemical inertness of the PTFE. It is believed that the bond is a frictional bond between the two surfaces resulting from the thermal expansion of the two materials during the autoclave operation but especially due to the retractive qualities of the PTFE through thermal cycling.

EXAMPLE IV

Comminuted expanded porous PTFE was molded using the die form compression method. Placing comminuted expanded, porous PTFE powder in a die and compressing the material to 1500 psi (10.34 MPa) or greater yielded rigid shapes. Greater loads such as 2500 psi (17.24 MPa) which the powder was subjected to, tends to produce articles having densities near to full density PTFE at 2.2 grams/cc. The use of vacuum also aides in the densification aspect of compression die molding to reduce the void content of the article. The shape of the article depends on the shape of the compression die. Further strength can be gained by sintering the molded PTFE article at a temperature between 327° C. and PTFE's sublimation temperature. Using the die-form compression process, the material is able to hold a shape after undergoing a compressive load at room temperature of about 3000 psi (20.68 MPa) restrained in the desired shape. As typical of molded PTFE articles, substantial strength is imparted to the molded article upon heating above the melt temperature (327° C.) thus placing the article in the gel state thereby coalescing the particles and then, cooling the article below the melt temperature. Moreover, the sintered PTFE article can be post formed as well by heating and forming under pressure.

EXAMPLE V

This example is used to characterize certain properties of several PTFE materials after they been hot-isostatically molded into thin sheets in the process described in Example I for forming thin sheets.

Several commercially available PTFE resins, several comminuted expanded PTFE articles and one coarsely shredded expanded PTFE materials were hot isostatically processed into thin sheets in a process as described in EXAMPLE I. The commercially available PTFE resins were: Granular PTFE powder TF1750 from Custom Compound, Inc. a subsidiary of Hoechst-Celanese Corporation, 50 Milton Drive, Aston, Pa. 19014; Granular PTFE powder G311 from ICI Fluoropolymers, Exton, Pa. 19341; Granular PTFE powders 7A and 9B from E. I. Du Pont de Nemours, Company, Wilmington, Del.; and Fine Powder PTFE 6C from E. I. Du Pont de Nemours, Company, Wilmington, Del.

The comminuted materials were size-reduced to an average particle size of 50 (m using the modified Morehouse Colloid Mill comminution process described in EXAMPLE I. The materials which were comminuted by the process are: unsintered expanded PTFE 12.7( mm rod expanded uniaxially 8:1; unsintered expanded PTFE 1670 tex fiber expanded uniaxially 80:1; and sintered expanded PTFE 133 tex fiber expanded uniaxially 80:1. Sintered expanded PTFE fiber 44 tex expanded uniaxially 80:1 was coarsely ground to a mean fiber length of 7 mm using a Cumberland Shredder Model 435600-82005, from Cumberland, Leesona Corporation, Providence R.I. The shredder was outfitted with a sizing-screen containing 6.4( mm (0.25(inch) holes. All the expanded materials were expanded prior to coarse grinding and comminuting by the method taught in U.S. Pat. No. 3,953,566 to Gore.

TABLE

| Material | Density (g/cc) Av (SD) | Break Strength (MPa) Av (SD) | Elongation % at Break Av (SD) | 1st Heat of Fusion (cal/g) |
| --- | --- | --- | --- | --- |
| Comminuted Unsintered Uniaxially ePTFE 8.1 Rod | 2.24 (0.11) | 31.6 (4.1) | 323 (41) | 7.16 |
| Comminuted unsintered uniaxially ePTFE 80:1 fiber | 2.13 (0.10) | 45.85 | 51 | 4.67 |
| Comminuted Sintered, Uniaxially ePTFE 80:1 Fiber | 2.05 (0.068) | 30.51 (1.7) | 83 (13) | * |
| Coarse Ground Sintered ePTFE 80:1 Fiber (7 mm length) | 2.09 | 16.55 (3.7) | 18 (2.5) | 2.49 |

TABLE-continued

| Material | Density (g/cc) Av (SD) | Break Strength (MPa) Av (SD) | Elongation % at Break Av (SD) | 1st Heat of Fusion (cal/g) |
|---|---|---|---|---|
| Hoechst TF 1750 PTFE | 2.17 | 18.96 (5.2) | 248 (73) | 5.69 |
| ICI G311 PTFE | 2.16 | 20.34 (1.2) | 320 (67) | 6.7 |
| DuPont T62 PTFE | 2.1 (0.023) | 23.70 (2.0) | 314 (18) | * |
| DuPont 7A PTFE | 2.16 (0.069) | 21.72 | 310 | 6.22 |
| DuPont 9B PTFE | 2.20 (0.057) | 21.37 | 195 | 6.97 |
| DuPont 6C Fine Powder PTFE | 2.21 | 19.08 (4.5) | 220 (108) | 5.7 |

The density of a hot-isostatically formed sheet was measured by cutting three randomly chosen 50.8( mm (2.00 (inch) sections using a 50.8( mm steel rule die and a clicker press per each sample. The weight of each circular disk was measured using an electronic analytical balance having a precision of (x.xxx) grams and averaged. The thickness of each disk was measured at least three different regions on each disk using a dial caliper having a precision of (x.xx) mm and averaged. Density was a calculated quantity of the average weight divided by the multiplicative quantity of the disk's cross-sectional area and the average thickness.

The break strength or yield to fracture and elongation percent to fracture was measured using a tensile tester Model #1011 from the INSTRON, Corporation of Canton, Mass. The INSTRON machine was outfitted with clamping jaws which are suitable for securing the coupons during the measurement of tensile loading. The cross-head speed of the tensile tester was 25.4 cm per minute. The gauge length was 101.6 mm. The test specimens; 25.4 mm×152.4 mm rectangular coupons were cut from the sheets using a steel-rule die and a clicker press.

The first heat of fusion was measured using a Differential Scanning Calorimeter (DSC) model DSC-4 from PERKIN-ELMER Corporation using a scan rate of 10 degrees Celsius per minute and sample weights averaging 13 milligrams.

As shown in the above data, expanded PTFE materials expanded tended to show higher breakstrength values especially for materials which had experienced and expansion of eighty to one and that were not sintered prior to the hot-isostatic molding operation. (i.e. materials which had not been exposed to temperatures above the melt temperature of PTFE commonly agreed to be at 327 (C prior to the molding process).

We claim:

1. A polymeric molding resin comprising comminuted, sheared, and ground elongated particulate and being made of expanded porous polytetrafluoroethylene, said particulate having a nudular-microfibrillar structure, an irregular shape, a mean particulate size between 5 and 500 micrometers, and said particulate being entangled with one another.

2. The resin of claim 1 wherein the bulk density of the particulate is between 0.06 and 0.2 g/cc.

3. Process for preparing the particulate of claim 1 wherein a porous, stretched PTFE material is comminuted, sheared and ground into the particulate defined in claim 1.

* * * * *